United States Patent [19]

James

[11] 3,709,313
[45] Jan. 9, 1973

[54] ARTICULATED VEHICLE
[75] Inventor: Jack C. James, Long Beach, Calif.
[73] Assignee: Walt Disney Productions, Burbank, Calif.
[22] Filed: Jan. 21, 1971
[21] Appl. No.: 108,481

[52] U.S. Cl. ................... 180/21, 180/1 R, 280/1.22
[51] Int. Cl. .......................................... B62d 39/00
[58] Field of Search ......... 180/21, 6.48, 22; 280/1.22

[56] References Cited

UNITED STATES PATENTS

| | | | |
|---|---|---|---|
| 2,067,546 | 1/1967 | Rocher | 180/21 |
| 3,520,378 | 7/1970 | Slay | 180/21 |
| 2,625,771 | 1/1953 | Herrick | 280/1.22 UX |
| 3,506,079 | 4/1970 | Madler et al. | 180/22 |

FOREIGN PATENTS OR APPLICATIONS

| | | | |
|---|---|---|---|
| 474,270 | 2/1915 | France | 180/21 |
| 33,537 | 4/1905 | Switzerland | 180/21 |

Primary Examiner—Kenneth H. Betts
Assistant Examiner—John A. Pekar
Attorney—Fulwider, Patton, Rieber, Lee & Utecht

[57] ABSTRACT

An articulated vehicle including a frame having front and rear frame portions connected together on their adjacent sides by transversely extending pivot means. A pair of main wheels carry the pivot means and front and rear castor wheels carry the front and rear extremities of the respective front and rear frame portions. Control means is provided for driving the main wheels independently for steering the vehicle whereby such vehicle may be maneuvered in relatively restricted areas and articulation of such frame will enable the castor wheels to shift vertically with respect to the main wheels to accomodate uneven and irregular terrain.

5 Claims, 10 Drawing Figures

PATENTED JAN 9 1973

INVENTOR.
JACK G. JAMES
BY Fulwider, Patton, Rieber,
Lee and Utecht
ATTORNEYS

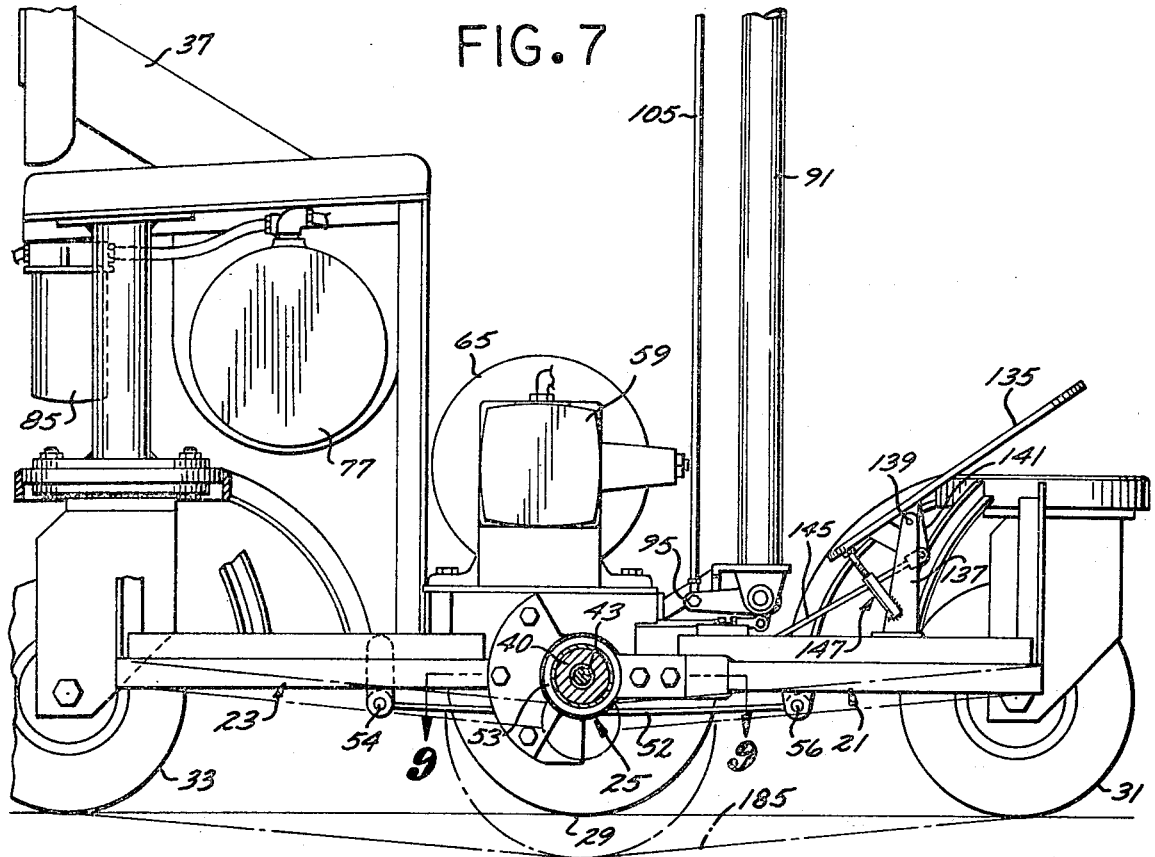
FIG. 7
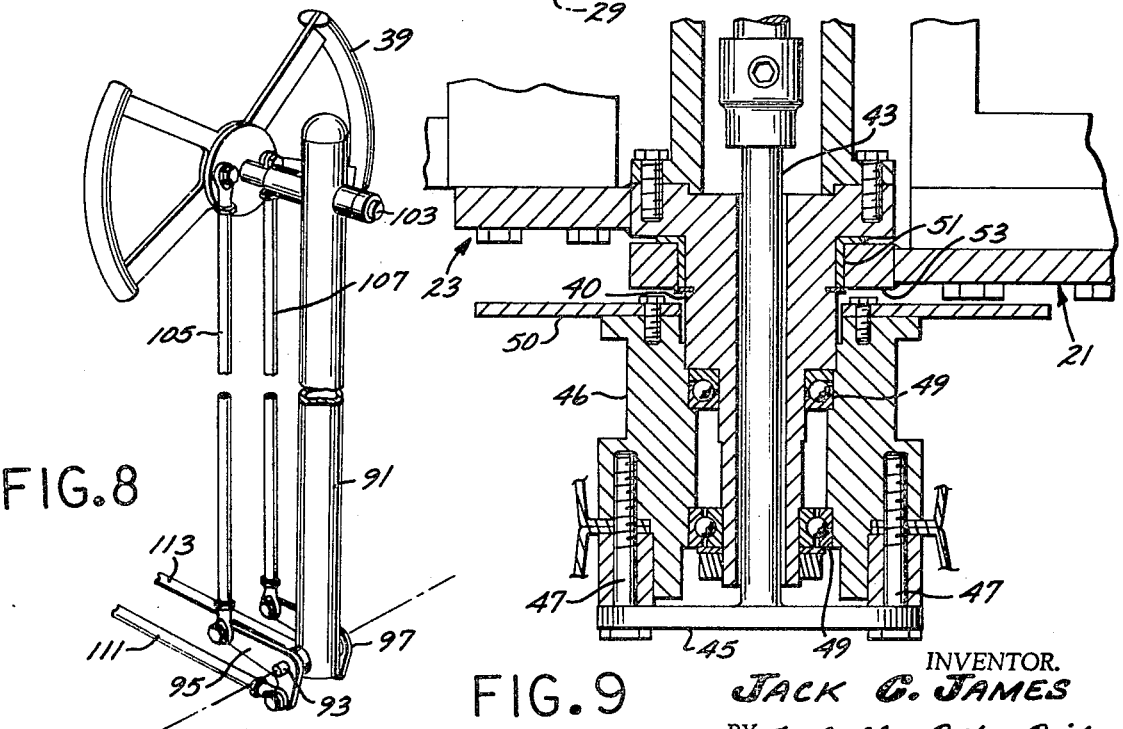
FIG. 8
FIG. 9
INVENTOR.
JACK G. JAMES
BY Fulwider, Patton, Rieber, Lee and Utecht
ATTORNEYS 3,709,313

ARTICULATED VEHICLE

BACKGROUND OF THE INVENTION

1. Field of the Invention

The articulated vehicle of present invention relates to highly maneuverable and stable vehicles for operating in close quarters and traveling over relatively uneven terrain.

2. Description of the Prior Art:

Numerous easily maneuverable vehicles have been proposed for operating in close quarters. These vehicles generally incorporate a pair of side-by-side main wheels having a castor wheel spaced lontigudinally therefrom in tricycle fashion as shown in U.S. Pat. Nos. 2,706,008 and 3,303,821. Vehicles of this type suffer the short coming of being relatively unstable when the load is carried directly over the main wheels since the vehicle may easily be tilted due to operation on an uneven terrain or wind forces acting on the load carried thereby to tip the vehicle about the main wheels thereby raising the castor wheel off the ground and spilling the load.

Vehicles have also been proposed which include side-by-side main wheels having castor wheels spaced both forwardly and rearwardly thereof as shown in U.S. Pat. No. 3,166,141. However, vehicles of this type are unacceptable for operation on relatively uneven terrain where traveling of the lead castor over a raise or depression will tend to raise one or both of the main wheels off the ground thereby tending to tip the entire vehicle.

SUMMARY OF THE INVENTION

The articulated vehicle of present invention is characterized by a pair of front and rear frame portions connected together by a transversely extending pivot means which is, itself, carried on its opposite extremities by a pair of main wheels. Front and rear castors are provided for carrying the remote extremities of the respective front and rear frame portions whereby a load may be carried from the frame and relatively free articulation of the frame will be provided to enable the castor wheels to move upwardly and downwardly with respect to the main wheels to thereby easily follow the contour of the terrain without imposing substantial unstabilizing forces on the vehicle.

Control means preferable for controlling the vehicle includes a control arm pivotally supported on one end from the frame and carrying a rotatable steering wheel on its opposite end. Individually controlled drive motors are provided for each of the main wheels and first and second linkages connect the controls of such motors with the opposite sides of the steering wheel whereby turning of the steering wheel in one direction will speed up the first motor and slow the second motor to cause the vehicle to turn in one direction and turning of the steering wheel in the opposite direction will slow the first motor and speed up the second motor. Further, tilting forwardly and rearwardly of the control arm will speed and slow, respectively, both motors to thereby speed up or slow down the vehicle while maintaining its direction of travel. With control arm at neutral, turning steering wheel clockwise will cause left motor to run forward and right motor to run reverse to cause the vehicle to travel in a spiral path.

An object of the present invention is to provide an articulated vehicle of the type described which is relatively stable for operating over uneven terrain and will remain stable when relatively large forces act forwardly or rearwardly on the load carried thereby.

Another object of the present invention is to provide an articulated vehicle of the type described wherein the support wheels are independently shiftable upwardly and downwardly to accommodate uneven terrain without incorporating biasing springs which may apply an unstabilizing force to the vehicle whenever any one of the wheels passes over a raise or depression in the terrain.

A further object of the present invention is to provide an articulated vehicle of the type described which is relatively easy to control and can be operated by a relatively unskilled operator.

An additional object of the present invention is to provide an articulated vehicle of the type described which maintains its load evenly distributed between four different wheels irrespective of the terrain.

Another object of the present invention is to provide an articulated vehicle of the type described which is relatively compact so it can be concealed within a relatively small area in the lower portion of a decorative figure constituting the load to be carried thereby.

These and other objects and the advantages of the present invention will become apparent from a consideration of the following detailed description when taken in conjunction with the accompanying drawings.

DESCRIPTION OF THE DRAWINGS

FIG. 7 is a side elevational view of the articulated vehicle shown in FIG. 6;

FIG. 8 is a perspective view, in enlarged scale, of a control system included in the articulated vehicle shown in FIG. 1;

FIG. 9 is a horizontal sectional view, in enlarged scale, taken along the line 9—9 of FIG. 7; and FIG. 10 is an electrical-hydraulic schematic of a control system which may be utilized with the articulated vehicle shown in FIG. 1.

DESCRIPTION OF THE PREFERRED EMBODIMENT

Figure 1:
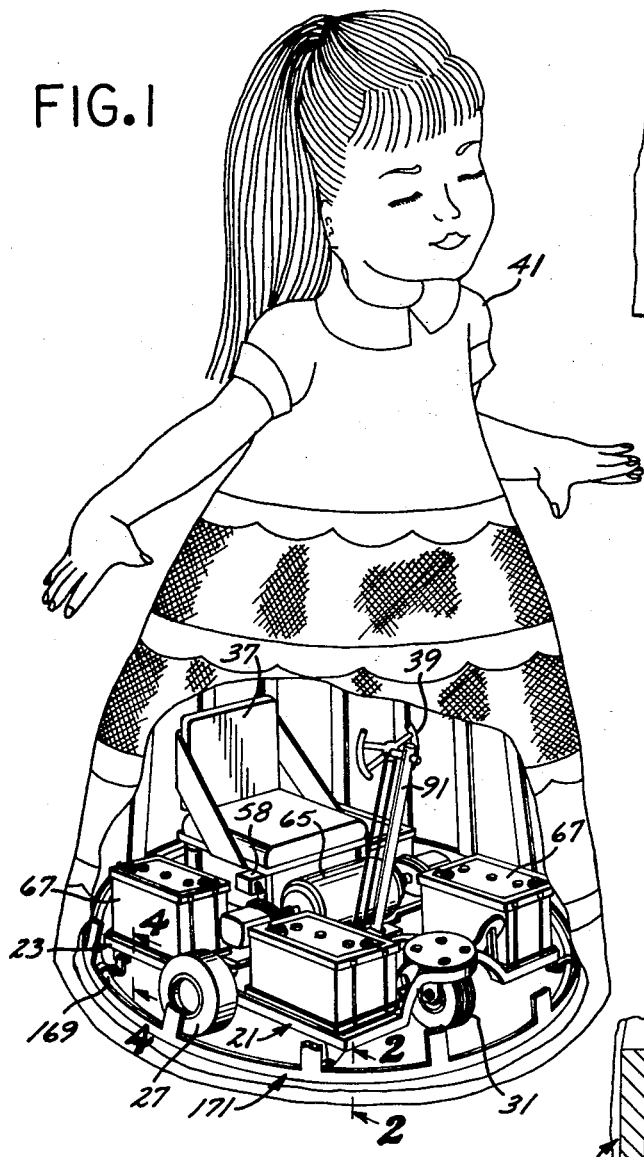
FIG. 1 is a perspective view, partially broken away, of an articulated vehicle embodying the present invention.
Figure 2:
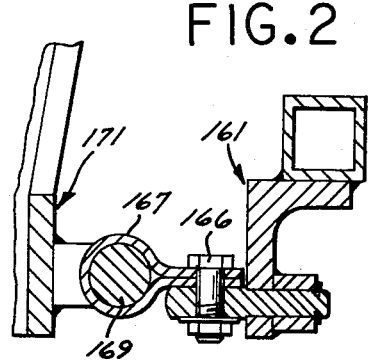
FIG. 2 is a vertical sectional view, in enlarged scale, taken along the line 2—2 of FIG. 1.
Figure 3:
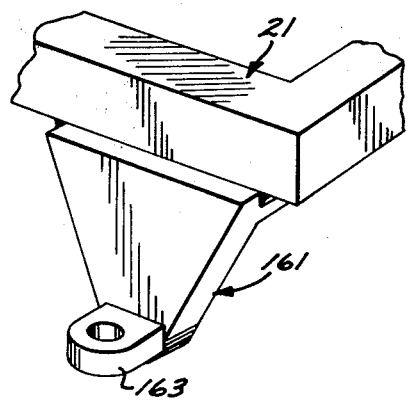
FIG. 3 is a detail view of FIG. 2.
Figure 6:
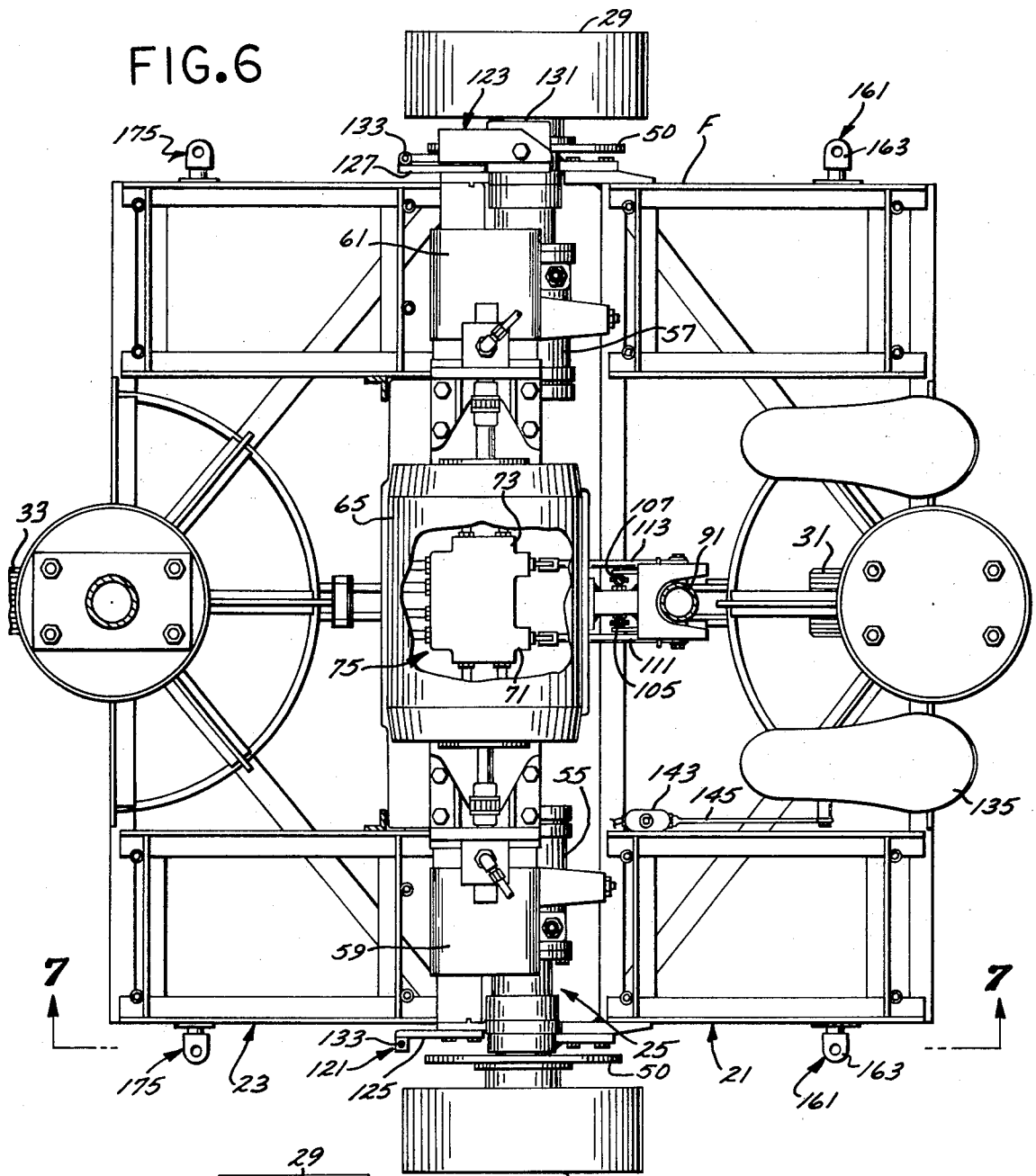
FIG. 6 is a top plan view, in enlarged scale, and partially broken away, of the articulated vehicle shown in FIG. 1.

Referring to FIGS. 1, 6 and 7, the articulated vehicle of present invention includes, generally, a frame F including front and rear frame portions 21 and 23 which are connected together by means of a transversely extending hinge joint 25. A pair of main wheels 27 and 29 support the hinge joint 25 and respective front and rear caster wheels 31 and 33 support the respective front and rear extremities of the respective frame sections 21 and 23. Referring to FIG. 1, an operator's seat 37 is mounted on the frame F and a steering wheel 39 is provided for control thereof whereby a large figurette 41 for parades and the like may be mounted on the frame F and an operator may sit on the seat 37 and steer the vehicle. Referring to FIG. 7, any one of the four wheels 27, 29, 31 or 33 may raise or lower independently of the remaining three wheels to accommodate a raise or depression in the terrain while all four wheels cooperate to provide secure support for the vehicle and the supported figurette 41 to thereby prevent its tilting or tipping over.

The frame sections 21 and 23 are generally rectangular and the rear section 23 carries hollow spindles 40 on the opposite side of its forward extremity for telescopical receipt therethrough of transversely projecting respective axle shafts 43. The outer extremities of the axle shafts 43 are formed with respective flanges 45 which overlie the outer ends of such spindles and are secured to the hubs 46 of the respective wheels 27 and 29 by means of studs 47. The hubs 46 are mounted on the respective spindles 40 by means of roller bearing assemblies 49 whereby the weight of the vehicle is carried on such spindles rather than on the axle shafts 43. Brake disks 50 are affixed to the inner extremities of the respective hubs 46 to enable braking of the drive wheels 27 and 29. The inner extremities of the spindles 40 have bearings 51 telescoped thereover for receipt of respective rotatable collars 53 which mount the rear extremity of the front frame section 21 to thereby form the hinge joint 25.

Pivoting of the frame sections 21 and 23 about the hinge joint 25 is limited by a slightly resilient limit bar 52 (FIG. 7) that spans such joint and is secured on its opposite ends to such frame portions by respective pins 54 and 56.

Referring to FIGS. 6 and 10, the respective wheels 27 and 29 are driven by respective hydraulic motors 55 and 57 connected to the inner ends of the respective axle shafts 43. The motors 55 and 57 are driven by respective hydraulic pumps 59 and 61. The pumps 59 and 61 are driven by an electric motor 65 which has four series connected storage batteries 67 connected therewith and current to such motor is controlled by a switch 58. The rate of hydraulic fluid flow from the respective pumps 59 and 61 to the respective motors 55 and 57 is controlled by respective motor control valves 71 and 73 incorporated in a spool valve, generally designated 75 (FIG. 6). A hydraulic fluid reservoir 77 is connected with the spool valves 71 and 73 by means of respective conduits 81 and 83 which include respective filters 85 and 87. The valves 71 and 73 are spring loaded to close and the spools therein are movable in one direction from neutral to affect forward rotation of the respective motors 55 and 57 and in the opposite direction to affect reverse rotation of such motors.

Referring to FIGS. 7 and 8, a control post 91 is mounted at its lower extremity from the frame F by means of a pivot pin 93 which also mounts a pair of freely rotatable bell crank lever arms 95 and 97 on opposite sides of such post. A steering wheel 39 is carried from the upper extremity of the post 91 by means of a pivot pin 103 and has its opposite sides connected with the rearwardly projecting legs of the respective bell cranks 95 and 97 by means of connecting links 105 and 107. The opposite legs of such bell cranks 95 and 97 are connected with the control poppets of the respective valves 71 and 73 by means of respective connecting links 111 and 113.

Referring to FIG. 6, brake shoe assemblies, generally designated 121 and 123, are mounted adjacent each of the brake disks 50 by means of respective mounting brackets 125 and 127. A caliper type brake plunger and shoe arrangement 131 is carried from the respective mounting brackets 125 and 127 by means of pivot pins 133 whereby the respective disks 50 may be braked while avoiding applying any significant axial force thereto.

Figure 4:
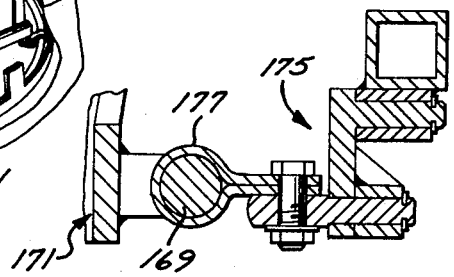
FIG. 4 is a vertical sectional view, in enlarged scale, taken along the line 4—4 of FIG. 1.
Figure 5:
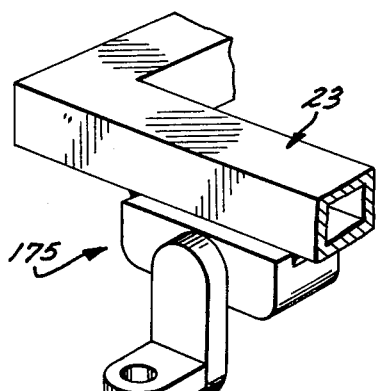
FIG. 5 is a detail view of FIG. 4.

Referring to FIGS. 6 and 7, a brake pedal 135 is pivotally mounted from a mounting bracket 137 by means of a pivot pin 139. The brake pedal 135 is formed with a downwardly projecting lever 141 which has its lower extremity connected with a master brake cylinder 143 (FIG. 6) by means of a connecting link 145. Referring to FIG. 7, the brake pedal 135 is biased to its released position by means of a biasing spring assembly, generally designated 147. Referring to FIGS. 2-6, the forward frame section 21 has a pair of mounting brackets, generally designated 161, mounted on opposite sides thereof and such brackets include boss members 163 that have mounting tabs 167 secured thereto by means of mounting bolts 166. The mounting tabs 167 encircle a mounting ring 169 which carries the framework 171 forming the base of the figurette 41. Referring to FIGS. 4, 5 and 6, the rear frame section 23 also carries a mounting bracket, generally designated 175, and such mounting bracket mounts a clip 177 that encircles the mounting ring 169.

It is of particular advantage to provide the mounting frames 171 integral with the different figures 41 and that they each include mounting rings 169 which may be interchangeably mounted on the mounting brackets 161 and 175 whereby the figure 41 may be readily removed from the frame F for repair work to such figure or repair work to the vehicle itself. Further, the different figures 41 may then be easily and conveniently interchangeably mounted on the frame F.

In operation, the figure 41 is mounted on the frame F and the operator may position himself in the operator's seat 37 in the interior of the figure 41 and will be concealed from viewers watching the parade or other exhibition presented. The switch 68 may then be closed to energize the motor 65 to drive the respective hydraulic pumps 59 and 61. The operator will grasp the steering wheel 39 and may move it forwardly thereby pivoting the upper extremity of the control post 91 forwardly and, concurrently, pivoting the lower extremity of the bell cranks 95 and 97 rearwardly to thereby depress the control poppets of the valves 71 and 73 to open such valves and increase the hydraulic flow rate to the respective drive motors 55 and 57 to thereby increase the speed of such motors equally to cause the main wheels 27 and 29 to rotate at the same speed to drive the vehicle forwardly in a straight line.

As the vehicle moves over raises and depressions in the terrain, the respective wheels 27 and 29, 31 and 33 will remain relatively free to shift upwardly and downwardly with respect to one another to thereby accommodate unevenness in the terrain while carrying substantially equal weight and maintaining stability for the figurette 41. Referring to FIG. 7, when a depression 185 in the terrain is encountered, the lead caster 31 will travel downwardly thereinto causing the front extremity of the front frame section 21 to pivot downwardly about the hinge joint 25 while the remaining three wheels 27, 29 and 33 remain in a substantially horizontal plane. Consequently, the mounting brackets 161 carried by the front extremity of the frame section 21 will be lowered slightly thereby causing the upper extremity of the figurette 41 to tilt forwardly a slight amount.

Subsequently, as the vehicle continues its forward movement, the caster 31 will travel upwardly out of the depression and the main wheels 27 and 29 will drop downwardly thereinto as shown in broken lines in FIG. 7. Consequently, the front mounting brackets 161 will be raised upwardly and will be maintained on substantially the same level as the rear mounting brackets 175 to thereby cause the figurette 41 to again assume its totally upright position. The main wheels 27 and 29 will travel upwardly out of the depression and the rear caster wheel 33 will travel downwardly thereinto thereby lowering the rear mounting brackets 175 and causing the figurette 41 to tip rearwardly a slight amount. It is important to note that the articulation of the frame F produced by the hinge joint 25 will substantially reduce the amount of tilting for the figurette 41 over that which would be produced by an unarticulated frame traveling over similar uneven terrain.

When the operator wishes to turn the vehicle to the right, he merely rotates the steering wheel 39 clockwise to move the link 105 (FIG. 8) downwardly and the link 107 upwardly thereby rotating the bell crank 95 counterclockwise and the bell brank 97 clockwise to thereby close the valve 71 further and open the valve 73 more to thereby decrease the speed of the motor 55 and increase the speed of the motor 57 to cause the vehicle to turn to the right. It will be apparent that the wheel 39 may be turned sufficiently far to completely stop the motor 55 and operate the motor 57 at full speed to thereby cause the vehicle to turn rapidly about the main wheel 27 while such wheel is held stationary.

It is particularly important that the control system for the vehicle is integrated to thereby enable a relatively inexperienced operator to put the articulated vehicle of the present invention through relatively coordinated continuous maneuvers to produce an eye appealing movement for a figurette 41. As an example, as described hereinabove, the steering wheel 39 may be held against rotation and moved to its full forward position thereby pivoting the control post 91 fully forward and rotating the bell cranks 93 and 97 to their full clockwise position as used in FIG. 8 to fully open the respective valves 71 and 73 to cause the respective motors 55 and 57 to rotate both wheels 27 and 29 in the forward direction at full speed. The operator may then rotate the steering wheel 59 clockwise while maintaining such wheel pressed forwardly but since the left hand valve crank 97 is already rotated fully clockwise as viewed in FIG. 8, such rotation of the wheel 39 will cause the link 107 to pull the steering wheel 39 rearwardly thereby pivoting the upward end of the post 91 rearwardly and pivoting the right hand valve crank 95 counterclockwise as viewed in FIG. 8. Such counterclockwise movement of the valve crack 95 will gradually close the right hand valve 71 thereby gradually slowing the motor 75 to slow the right hand drive wheel 27 to cause the vehicle to enter into a right hand turn. Continued turning of the wheel 39 will cause the right hand drive wheel 27 to slow further thereby causing the vehicle to move in circles of gradually decreasing diameter. When the steering wheel 39 has been turned clockwise sufficiently to close the right hand valve 71 entirely the right hand motor and drive wheel 27 will be stopped thereby causing the vehicle to rotate in a circle about a center defined by the right hand drive wheel 27.

Continued clockwise turning of the steering wheel 39 while maintaining such wheel pushed gently forward to the limit of travel will cause the upper extremity of the post 91 to move even further rearwardly thereby pivoting the right hand valve crank 95 even further counterclockwise as viewed in FIG. 8 to cause the right hand spool valve 71 to reverse hydraulic fluid flow through the motor 55 thereby causing the right hand wheel 27 to turn in reverse and causing the vehicle to move in a spiral path. Continued clockwise turning to the right of the steering wheel 39 will cause the right valve crank 95 to assume its full clockwise position as shown in FIG. 8 to thereby fully reverse the right hand motor 55 and to cause the right hand drive wheel 27 to rotate at full speed in reverse thereby causing the vehicle itself to turn on its own center. This type of maneuver is particularly crowd pleasing and, when effected as described hereinabove, is relatively easy for an inexperienced operator to produce.

It should be noted that when the steering wheel 39 is turned while being held in either its full forward or its full back position, the respective forward or rearward speed of the vehicle is proportionally decreased as the sharpness of the turn is increased thereby slowing the vehicle to prevent the centrifugal force of the relatively top heavy figurette 41 causing the vehicle to overturn.

Referring FIG. 7, the limit bar 52 engages the joint 25 intermediately to restrict over rotation of the opposite ends of the articulated vehicle to thereby avoid jackknifing of the frame in case it should accidentally tip over while in operation to thereby avoid injury to the operator. Additionally, such limit bar will prevent jack-knifing when the articulated vehicle is lifted by a fork lift or a crane for loading purposes.

It should be appreciated that an articulated vehicle of the present invention provides for the entire weight of the figurette 41 to be evenly distributed between the four wheels 27, 29, 31 and 33 while the vehicle is operating over uneven terrain. This even distribution of weight is accomplished without the use of springs which frequently provide a relatively springy effect when any unbalance is incurred thereby causing swinging of the relatively tall figurette and producing an unstabilizing effect and an unattractive appearance.

From the foregoing it will be clear that the articulated vehicle of present invention provides a relatively stable vehicle which will maintain its stability while operating over relatively uneven terrain and during travel up and down relatively steep inclines. This is of particular importance in such localities as Disneyland park where depressions for storm water drainage are encountered in the parade route and it is desirable to accommodate the depressions formed thereby at relatively high speeds. The instability resulting from operating over uneven terrain is frequently compounded by wind acting on the relatively tall figures carried by such vehicles thereby creating relatively large unstabilizing forces on the vehicle which must also be resisted to prevent overturning thereof. Further, the vehicle may be conveniently operated with one hand by a relatively unskilled operator and, with only a relatively small amount of experience, he can accomplish relatively sophisticated and crowd pleasing maneuvers with the figurette.

Various modifications and changes may be made with regard to the foregoing detailed description without departing from the spirit of the invention.

I claim:

1. An articulated vehicle comprising:
   a frame including front and rear frame portions;
   pivot means connecting adjacent ends of said frame portions together;
   a pair of main wheels carrying said frame at said pivot means;
   front and rear caster wheels carrying the remote ends of said respective front and rear frame portions;
   a limit device interconnecting said frame portions and operative to limit relative movement therebetween;
   load-receiving means on said front and rear frame portions;
   drive means for driving said vehicle; and
   control means for controlling said vehicle whereby said frame may be driven over relatively uneven terrain and said frame portions will articulate about said pivot means to enable said caster wheels to move upwardly and downwardly with respect to said main wheels while providing support for a load carried on said load-receiving means and said limit device will limit pivoting of said frame portions relative to one another.

2. An articulated vehicle as set forth in claim 1 that includes:
   an operator's seat mounted on said frame; and
   wherein said control means includes a steering wheel disposed adjacent said seat for convenient access therefrom.

3. An articulated vehicle as set forth in claim 1 that includes:
   mount means on said frame; and
   a figure disposed over said frame and carried from said mount means.

4. An articulated vehicle as set forth in claim 1 wherein:
   said limit device includes a relatively stiff spring for resiliently limiting relative movement between said frame portions.

5. An articulated vehicle as set forth in claim 1 wherein:
   said pivot means includes a transverse axle; and
   said limit device includes a longitudinally extending spring connected on its opposite ends to said respective frame portions and engageable intermediately with said axle to limit rotation of said portions about said axle.

* * * * *